United States Patent [19]

Roper et al.

[11] Patent Number: 5,454,079
[45] Date of Patent: Sep. 26, 1995

[54] COMPUTER WORKSTATION

[75] Inventors: Michael I. Roper, Chandlers Ford;
Lawrence S. Evans, Basingstoke;
Graham D. Wallis, Southampton;
Anthony Fyles, Winchester; Andrew Key; Vincent Sethi, both of
Southampton, all of United Kingdom

[73] Assignee: International Business Machines Corporation, Armonk, N.Y.

[21] Appl. No.: 127,935

[22] Filed: Sep. 28, 1993

[51] Int. Cl.⁶ ................................................ G06F 13/38
[52] U.S. Cl. ................ 395/200; 364/260.6; 364/242.94; 364/940.62; 395/650
[58] Field of Search ..................... 395/200, 114

[56] References Cited

U.S. PATENT DOCUMENTS

| | | | |
|---|---|---|---|
| 4,386,416 | 5/1983 | Giltner | 395/375 |
| 5,153,936 | 10/1992 | Morris | 395/128 |
| 5,179,651 | 1/1993 | Taaffe | 395/154 |
| 5,325,483 | 6/1994 | Ise | 395/162 |
| 5,327,554 | 7/1994 | Palazzi | 395/600 |

*Primary Examiner*—David Y. Eng
*Attorney, Agent, or Firm*—Douglas W. Cameron

[57] ABSTRACT

A computer workstation runs an application 12 which generates data for transmission over a network. The workstation includes a communications subsystem 14 which is responsible for actually sending data generated by the application onto the network. The application therefore passes data 22 for sending to the communications subsystem, along with the identification 24 of the channel over which that data is to be sent, and compression information 26. In a first embodiment the communications subsystem contains a variety of compression routines 40, and the compression information indicates which of these routines is most appropriate for the data in question. In a second embodiment, the compression information is a call-back function 92, whereby the communications subsystem can call back to the application program to perform the compression itself.

5 Claims, 1 Drawing Sheet

COMPUTER WORKSTATION

DESCRIPTION

1. Technical Field

This invention relates to an apparatus and method for compressing data for transmission on a communications network. More specifically, data is compressed according to the type of data to be transmitted and the communication facilities available.

2. Description of the Prior Art

Over the last few years it has become increasingly common to connect personal computers or workstations together into networks so that different machines can communicate with one another. A typical approach has been the introduction of local area networks (LANs) that provide file transfer and other facilities between computers. Other types of link, for example Integrated Services Digital Network (ISDN), are also known. Most such digital networks are based on packet switching, in which data is broken down into packets or segments before transmission. Each segment has its own identification, address information, and so on to allow it to be transmitted across the network. On receipt, this address information etc is stripped out (and verified), to allow the original data to be reconstituted.

Modern networks have allowed the development of facilities that provide real-time interaction between users. One example of this is collaborative working as described in EPA 475581, in which users of two or more different machines work simultaneously and in combination on a single program (for example a spreadsheet). This program will be running on just one of the machines, but its output will be displayed at the other workstations, so that multiple users can interact with the program. Another example of a real-time interactive facility would be video conferencing, in which a video image of a user captured at one terminal appears on the screen at a second terminal, and vice versa.

In general a workstation involved in such collaborative processing or video conferencing includes a communication subsystem separate from the user application, to handle the transmission and receipt of data to and from other terminals in the network. The application and the communications subsystem interact via a predefined interface. Thus the application passes messages for transmission to the communication subsystem, which is responsible for actually sending them over the network, and likewise incoming messages are received first by the communication subsystem before being forwarded to the application. For example, the application may simply request that a message be transmitted to another user "FRED" (for example), leaving the communication subsystem to be responsible for identifying "FRED" with a valid network address and for converting the message into correctly-sized packets complete with address information and so on. The purpose of such a split between the application and the communication subsystem is to allow the application to be as independent as possible from any details about the network itself. It is therefore possible (in theory at least) to run the same application on many different networks, providing that the communication subsystems used offer the same interface. Likewise, the communication subsystem is designed to be independent of any one particular application, but rather can be used with a variety of applications.

A central aspect of such real-time interactive applications is the need for rapid communications over the network. For example, in collaborative processing, any modifications to the display on which the shared program is actually running (for example a change in a graph) must appear practically simultaneously on the screens of all the other workstations involved. Likewise in video conferencing, it is essential for a video image to be displayed as soon as possible after capture on all the screens. Too large a delay over the network removes the spontaneity of collaborative working or video conferencing, and so loses most of the benefits.

A major problem in achieving the required simultaneity between workstations is that the connections between the computers can only transmit data at a limited rate, particularly so if relatively low bandwidth telephone-based ISDN lines or similar are used or if traffic on the line is particularly heavy. The most common way of minimizing these transmission delays is to use a data compression algorithm to reduce the amount of data that must be transmitted. There are many techniques available to perform data compression, the most appropriate and efficient one in any particular circumstance depending on the type of data in question. For example, video applications normally use some form of hardware motion vector algorithm, whilst collaborative processing may be more suited to run length coding, or modified Huffman.

While most data must be compressed before transmission, for high bandwidth networks where the transmission delay is low it is usually more efficient to send uncompressed data—otherwise, more time is lost in compression and decompression of the message than is saved by the reduced transmission time. Since the application does not know any details about the network, the application itself cannot determine whether or not data for sending to any given destination should be compressed—indeed, the application may not even be aware that the data is to be transmitted to a remote terminal, as opposed to being processed at the workstation (an important exception to the above is in video conferencing, in which the volumes of data generated are so large that hardware compression techniques are almost always used automatically).

As a result, the communication subsystem receives uncompressed data from most applications. The communications subsystem can then decide, based on its knowledge of the links over which the data is to be transmitted, whether or not it would be quicker to compress the data. However, a problem arises here in that the communications subsystem is designed to be independent of the application, so that is knows very little about the data that is passed to it from the application. In particular, it cannot determine which compression technique is most suitable for that particular data, or indeed whether the data has already been compressed (for example in the case of video conferencing), in which case any further attempt at compression is likely to be counterproductive.

Thus the application which knows about the data does not know about the network, and the communications subsystem, which does know about the network, does not know about the data. This present a problem for the efficient management of such a digital data system, in that it is unclear when and how to compress data, whilst maintaining the desired independence of the application and communications subsystem.

SUMMARY OF THE INVENTION

Accordingly, the invention provides a computer workstation for connection into a network, said workstation including application means and a communications subsystem, whereby messages generated by the application means are passed to the communications subsystem for transmission onto the network, and characterized in that:

the application means includes means for adding information to the message concerning how the message should be compressed;

and the communications subsystem includes means responsive to said information for processing the message accordingly.

In the first preferred embodiment, the information added to the message is a callback function included in the applications means to compress the message, and the means responsive to the information includes means for invoking the callback function. This allows the compression to be performed by the application itself, which is desirable since the application obviously knows most about the data. The application may just support a single compression routine, or it may contain a variety, but because the application is able to interpret the data, it can decide if necessary which compression algorithm to use on any particular message. This approach is very flexible, since it allows an application to use the best compression method for the data it produces.

Since the communications subsystem does not know exactly which compression technique will be used by any given callback function, it cannot always tell if compression on a given link will be justified for a given data set. Preferably therefore the means for invoking the callback function includes means for passing information to the callback function to provide some indication of the desirability of compressing the message, and the call-back function includes means for responding to this indication to decide whether or not to compress the message. This information might for example be a simple rating of the bandwidth of the link. A preferred form is that the indication provided to the call-back function is a time value within which the compression should be performed, and the call-back function includes means for determining whether the message can be compressed within the time value, and if not, returning the message to the communications subsystem uncompressed. The calculation of the time value could be simply derived from an estimated transmission time (based on packet size and bandwidth), or could include more complicated factors such as an estimated compression/decompression time, probable bandwidth reduction if compression is used, and so on.

In a second preferred embodiment, a slightly different approach is used, in that the communication subsystem includes means for compressing the data according to one or more different compression techniques, and the information added to the message indicates which compression technique is most appropriate for that message. In this embodiment, the communications subsystem performs the compression itself and has available a selection of compression techniques. The information provided by the application can be used to determine which technique (if any) should be used. This approach is less flexible than the call-back method, since applications are restricted in the compression techniques that can be used to those offered by the communications subsystem. Nevertheless, since all the processing is done by the communications subsystem itself, this method can have advantages in terms of speed and simplicity.

Preferably the communications subsystem places messages for transmission in a queue, and the communications subsystem further includes means responsive to the information added to messages for determining whether they are amenable to data spoiling. Data spoiling is where in a sequence of packets, particular packets are either deleted or modified, because the information they contain is updated later in the sequence and so is no longer required. Spoiling therefore helps to prevent too large a backlog of packets building up in a queue, and so helps to reduce transmission delay.

The invention also provides a method of operating a computer workstation connected into a network, said workstation including application means and a communications subsystem, whereby messages generated by the application means are passed to the communications subsystem for transmission onto the network, characterized by:

the application means adding information to the message concerning how the message should be compressed;

and the communications subsystem responding to said information and processing the message accordingly.

An embodiment of the invention will now be described by way of example with reference to the following drawings.

DESCRIPTION OF THE PREFERRED EMBODIMENT

Figure 1:
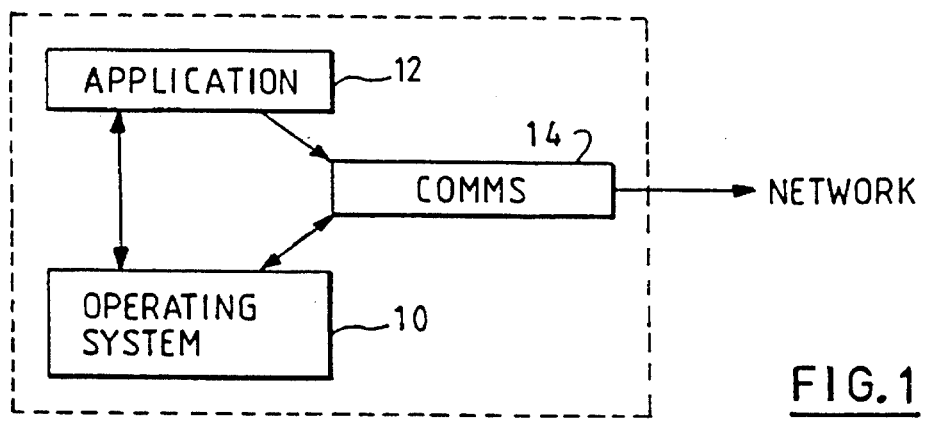
FIG. 1 is a schematic diagram of the main components of a computer workstation for connection into a network.

FIG. 1 depicts in schematic form the structure of a computer system for connection into a network, as is well-known in the art. The computer runs an operating system 10, which in turn supports an application 12, and also contains a subsystem 14 which controls communications with the network. The present invention is particularly concerned with data generated by the application for transmission over the network. This data is passed by the application to the communications subsystem for insertion onto the network. It should be appreciated that the application may well actually be two programs, the first a true application (e.g. a spreadsheet) and the second a facility to enable collaborative working. Alternatively the application may constitute just a single program, for example a video conferencing software package.

The system is designed so that the application does not need to know any details about the physical properties of the network (in other words the network structure is transparent to the application). Thus the application can simply request a link to another terminal, and direct data to it, leaving the communications subsystem to worry about the actual transmission. This design, which is standard in such data communications environments, allows applications to be written much more easily, and provides a greater degree of interchangeability as far as the application and communication subsystem are concerned.

Figure 2:
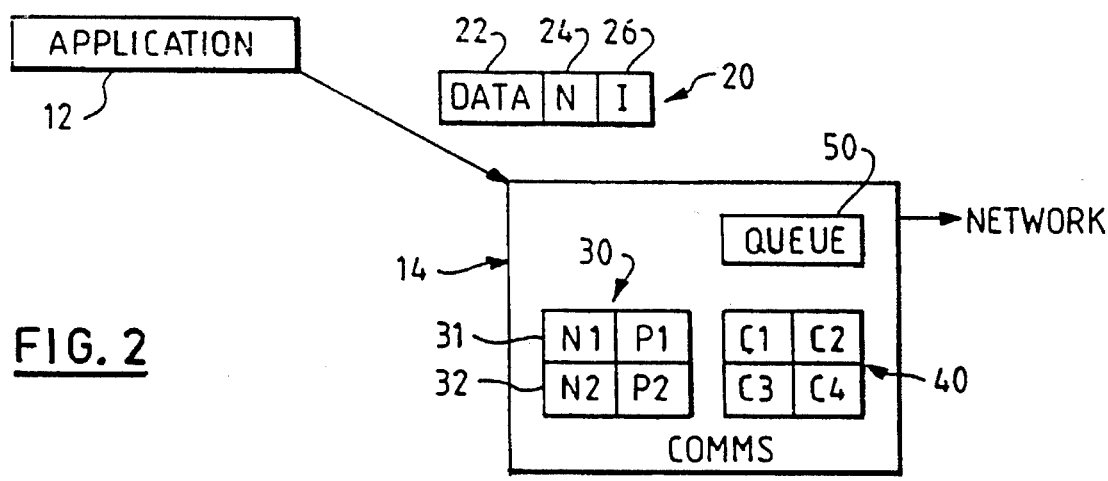
FIG. 2 is a schematic diagram of the processing of messages in a first embodiment of the invention.

FIG. 2 shows the interaction between the application and the communications system in more detail in a first embodiment of the invention. The application generates packets 20 for transmission. Each packet contains data 22, a channel identifier 24, and compression information 26. The channel identifier specifies the destination of the packet, or the link over which it is to be sent. When the packet is received from the application by the communications subsystem, the channel identifier is read. The communications subsystem then refers to a table 30 which it maintains containing information about the various physical links. Thus each entry in the table 31, 32 corresponds to a physical link (N1, N2) and includes data on e.g. bandwidth, maximum frame size, and so on for that link (P1, P2 respectively). It is also possible for this table to contain updates about traffic conditions on the link, to provide a more accurate picture of network performance. The communications subsystem then uses the information in the table for the link specified by the channel identifier to determine whether or not to compress the data (if a high bandwidth link is available it may not be necessary to compress the data).

If the communications layer does decide to compress the data, then it needs to know about the data in order to decide how best to compress it. For example, in some applications such as video conferencing a slight loss of information content can be tolerated to enhance compression efficiency, whereas in data file transfer it is important to maintain the complete information content of the message. The communications system includes a set of compression routines 40 (depicted as C1, C2, C3, C4). It uses the compression information 26 to determine which of these is most suitable for the data in question, and then compresses the data accordingly.

Once individual packets have been compressed, they are placed in a queue 50 for transmission onto the network. Sometimes there can be a delay in actually being able to submit the packets onto the link, with the result that the queue builds up. For some applications the data waiting to be transmitted is spoilable. This implies that once a more recent packet is available for transmission, then older packets can be deleted without being transmitted. An example of spoilable data would be a video signal transmitted as a still frame followed by a number of updates (an approach used to save bandwidth, since in many videos large areas of the image do not change from frame to frame). If a queue of video packets builds up to the extend that there are two still frames in the queue, it may be sesirable to delete the older still frame, along with all its associated updates. Of course, the result of this is that the portion of the video depicted by the deleted still image and updates is never viewed at the receiving terminal. Nevertheless, the backlog in the buffer can be reduced, which will reduce the overall delay between the application sending a packet for transmission and it being displayed at the receiving terminal. This is very valuable for example in video conferencing, where the sending and display should be as simultaneous as possible in order to maintain the naturalness and spontaneity of the interaction.

Spoiling can therefore be regarded as a form of data compression between packets. It is also necessary for the compression information to therefore indicate whether or not the packets in that data stream (i.e. having the same channel identifier) are suitable for spoiling—clearly the deletion of whole packets is not appropriate for all types of data. The communications system therefore also includes a unit that examines the compression information of packets in the queue, and performs the spoiling operation if required.

Thus in the embodiment of FIG. 1 the communications subsystem is provided with hints in the message packets themselves in order to make sensible decisions on whether and how to compress the data in that message. The communications subsystem uses this information to decide which compression technique (if any) should be employed. This approach however does not having the drawback that it is relatively inflexible. Thus the communications subsystem can only provide a limited range of compression techniques. These are likely to be suitable for all applications, which may having their won specialized requirements. In such cases a somewhat inappropriate compression technique may have to be used, which will not provide optimum efficiency. Furthermore, it is also necessary for the application to know about the compression techniques provided by the communications subsystem, in contradiction to the desired independence between these two components.

Figure 3:
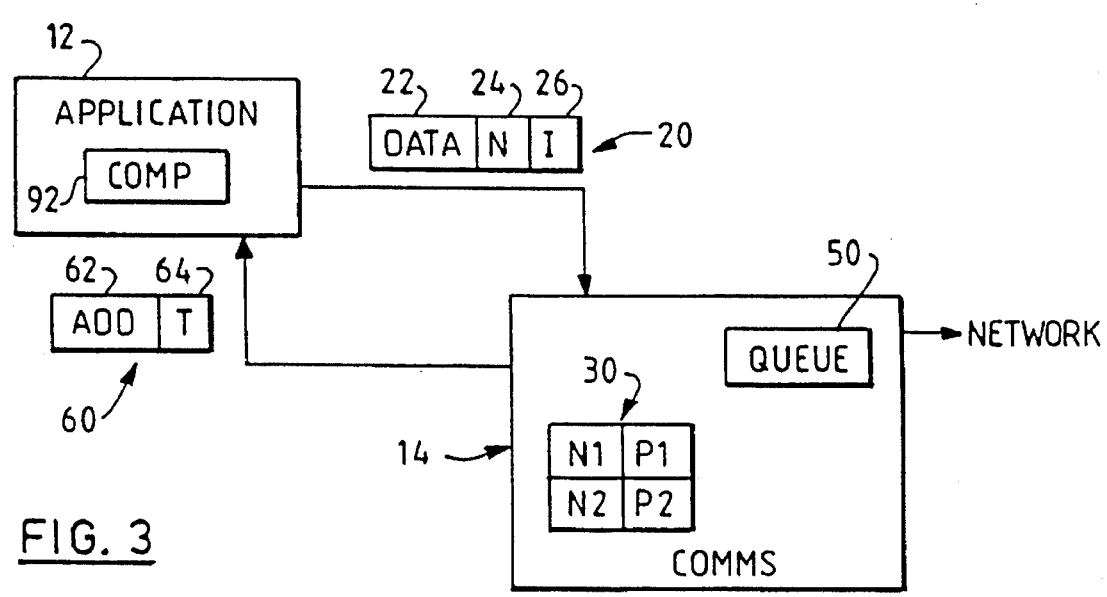
FIG. 3 is a schematic diagram of the processing of messages in a second embodiment of the invention.

A way around these problems is provided by the embodiment of FIG. 3. Again, the application passes a packet 20 to the communications subsystem, the packet containing data 22, a channel identifier 24, and compress information 26. However, this time instead of the compress information providing a hint to the communications subsystem about the form of compression to use, it contains the address of a call-back function in the application (call-functions are a well-known programming technique, and are described for example in "Advanced C++: Programming Styles and Idioms" by James Coplien, Addison Wesley, 1992).

As before the communications subsystem reads the channel identifier and then accesses information about the intended link. However, instead of now deciding whether or not to perform the compression, the communications subsystem uses the information in table 30 to calculate a time limit. This time limit is an estimate of the time that would be saved by sending compressed data over the link. The communications then invokes the call-back function 92 in the application, passing it a pointer 62 to the data in the packet concerned as well as the time limit 64. The application call-back function then determines whether or not compressing the data would be worthwhile, and if so performs the compression itself.

This approach has the advantage that the compression is effectively performed by the application, which knows most about the data. Thus it can be ensured that the compression technique selected is most appropriate to the data in question. The call-back function can also be extending to handle the spoiling of packets in a queue. In this case the call-back function would be passed two or more packets and asked to spoil them if appropriate.

It should be appreciated that the techniques described above do not necessarily have to be performed at the terminal that originated the data. Thus in many networks it is common for information to be sent from A to B to be subsequently forwarded from B to another node, C. If we suppose that the link from A to B has a high bandwidth, and the link from B to C has a much lower bandwidth, then messages generated at A can be sent first to B in uncompressed form. If it is then desired to forward these messages to C, then they must be compressed. Providing that the software at B is compatible with that at A, then the compression information inserted by A can be used at B in order to compress the data. Thus in accordance the first embodiment, the communications subsystem in B can read the compression information to determine which compression routine is most appropriate for this data. Alternatively, in accordance with the second embodiment, the communications subsystem in B can invoke the call-back function provided by the message in order to have the application compress the data. Note that in this case the message will be compressed by the application running on B, not on the original terminal A. In either case, it is clearly necessary in this situation to ensure that consistent terminology is used throughout the network.

Having thus described our invention, what we claim as new and desire to secure by Letters Patent is:

1. A communications workstation for transmitting messages on a network connected thereto, said workstation comprising:

(a) application means for generating messages and for adding information to said messages, said information being addresses of callback functions in said application means, said callback functions being used to compress those of said messages that are determined as desirable for compression; and (b) a communication subsystem for receiving said messages and said information, said communication subsystem further comprising invocation means for calling said callback functions by sending indications of desirability of compressing said messages, where said callback functions, upon being called, operate on said indications to determine the desirability of compressing each of said messages, and where said callback functions compress those of said messages determined as desirable for compression, and where said communications subsystem transmits each of said compressed and noncompressed messages on said communications network.

2. A computer workstation as recited in claim 1, wherein said information added to said messages are addresses of callback functions in said application means, said function being used to compress said messages.

3. A computer workstation as recited in claim 1, wherein said communications subsystem comprising means for compressing said messages according to at least two compression techniques, where said information added to said messages indicates to each of said messages which respective one of said techniques should be used for compression.

4. A computer workstation as recited in claim 1, wherein each message comprises sequences of one or more packets each message comprises a sequence of one or more packets, and wherein said communications subsystem stores said sequence of packets in a queue, and wherein said subsystem further comprises means, responsive to said information, for determining whether particular ones of said packets in said queue should be deleted or modified.

5. A computer workstation as recited in claim 1, wherein said indications are time values within which compression should be performed, and wherein said callback functions determine whether said messages can be compressed within said times values, where each of said messages is compressed if it can be compressed within a respective one of said time values.

* * * * *